United States Patent
Trelewicz et al.

(10) Patent No.: US 6,912,674 B2
(45) Date of Patent: Jun. 28, 2005

(54) SYSTEM AND METHOD FOR DIAGNOSING PRINTER PROBLEMS AND NOTARIZING PRINTS BY EVALUATING EMBEDDED DATA

(75) Inventors: Jennifer Q. Trelewicz, Superior, CO (US); Eric W. Jepsen, Lafayette, CO (US); Patrick M. McCarthy, Firestone, CO (US)

(73) Assignee: International Business Machines Corporation, Armonk, NY (US)

( * ) Notice: Subject to any disclaimer, the term of this patent is extended or adjusted under 35 U.S.C. 154(b) by 743 days.

(21) Appl. No.: 09/892,397

(22) Filed: Jun. 27, 2001

(65) Prior Publication Data

US 2003/0005369 A1 Jan. 2, 2003

(51) Int. Cl.7 .................................................. G06F 11/30
(52) U.S. Cl. ........................................................ 714/44
(58) Field of Search ..................... 714/44, 45

(56) References Cited

U.S. PATENT DOCUMENTS

| | | | |
|---|---|---|---|
| 5,678,002 A | 10/1997 | Fawcett et al. | ............ 358/1.15 |
| 5,833,375 A | 11/1998 | Gauthier et al. | ........... 358/1.15 |
| 5,960,168 A | 9/1999 | Shaw et al. | ................. 358/1.15 |
| 5,995,723 A | 11/1999 | Sperry et al. | .................. 400/82 |
| 6,009,243 A | 12/1999 | Kim | ............................ 345/709 |
| 6,091,506 A | 7/2000 | Payne et al. | |
| 6,115,131 A | 9/2000 | Payne | |
| 6,115,132 A | 9/2000 | Nakatsuma et al. | |
| 6,145,031 A | 11/2000 | Mastie et al. | |
| 6,166,826 A | 12/2000 | Yokoyama | |
| 6,178,003 B1 | 1/2001 | Ha | |
| 6,184,995 B1 | 2/2001 | Sakai et al. | |
| 6,195,170 B1 | 2/2001 | Mizutani et al. | |
| 6,603,864 B1 * | 8/2003 | Matsunoshita | ............... 382/100 |
| 6,631,482 B1 * | 10/2003 | Marks | .......... 714/45 |
| 2001/0006585 A1 * | 7/2001 | Horigane | ...................... 400/70 |
| 2002/0009208 A1 * | 1/2002 | Alattar et al. | ................ 382/100 |
| 2002/0012445 A1 * | 1/2002 | Perry | ......................... 382/100 |
| 2002/0120944 A1 * | 8/2002 | Wasilewski | ................. 725/140 |
| 2004/0105571 A1 * | 6/2004 | Ikenoue et al. | ............. 382/100 |

FOREIGN PATENT DOCUMENTS

| | | |
|---|---|---|
| JP | 2000-029358 | 1/2000 |
| JP | 2001-096872 | 4/2001 |
| JP | 2002-271535 | 9/2002 |

* cited by examiner

*Primary Examiner*—Scott Baderman
(74) *Attorney, Agent, or Firm*—Jose Gutman; Fleit, Kain, Gibbons, Gutman, Bongini & Bianco P.L.; Scott W. Reid

(57) ABSTRACT

A method triggers a printer (106) to receive a trigger to initiate an embedding algorithm (220), receive the print data (228); read the printer configuration data (230); encode the configuration data (230); insert the configuration data (230) into the print data (228); send the print data (228) to a printhead (206); and print the data. The printed data is then scanned, run through analysis software, and the embedded data is returned. The embedded data can then be used to diagnose printer problems or as a digital notary.

26 Claims, 5 Drawing Sheets

SYSTEM AND METHOD FOR DIAGNOSING PRINTER PROBLEMS AND NOTARIZING PRINTS BY EVALUATING EMBEDDED DATA

BACKGROUND OF THE INVENTION

1. Field of the Invention

This invention generally relates to the field of printer systems, and more particularly relates to a system and method for diagnosing printer problems by evaluating embedded data in a printed image.

2. Description of Related Art

In today's high technology world, fast, efficient customer support is essential to the success of a business. The ability to quickly diagnose a customer problem and determine a solution is vital. In the printer support area, when a printer customer has print quality or operation problems, the current method of handling the inquiry is time and labor-intensive.

Typically, a call is placed by the customer, which is answered by one or more Customer Engineers (CEs). The CEs then run a series of diagnostic routines on the printer, checking for parts that need to be adjusted or replaced. If the problem is not solved through these methods, an additional level of support may be contacted. If this additional support level cannot assist the CE in finding the problem, print samples may be sent to Product or Development Engineering for analysis. Questions that will flow back to the CE may include the settings on the engine, the mix life, and other diagnostic information.

Given the amount of time that may pass between the initial call response and elevation to another department, the original settings on the printer may have been changed or lost. This is an expensive and inefficient way to trouble shoot print issues.

Therefore a need exists to overcome the problems with the prior art as discussed above, and particularly for a method of diagnosing printer problems by evaluating embedded data in a printed image.

SUMMARY OF THE INVENTION

According to a preferred embodiment of the present invention, a method triggers a printer to initiate an embedding algorithm, receive the print data, read the printer configuration or other data to be embedded, encode the data to be embedded, insert the encoded data into the print data, send the print data to a printhead and print the data. The printed data may later be scanned, run through analysis software, and the embedded data is returned. The embedded data can then be used to diagnose printer problems or to serve as a digital notary.

DESCRIPTION OF THE PREFERRED EMBODIMENTS

The present invention, according to a preferred embodiment, overcomes problems with the prior art by embedding information about the engine 202 in a print coming from the engine 202 in such a way that the image can be scanned without destroying the embedded data. This information may be embedded in every print, or just in specific test prints (the relative advantages of both approaches are described below). The CE obtains the print sample, with embedded data, during the initial call. The print sample may be forwarded to each subsequent department addressing the problem, as appropriate, so that the embedded data can be retrieved and analyzed. A diagnostic manual for the embedded data may be provided, allowing common print quality issues (resulting from engine settings or conditions) to be screened and solved immediately. The advantage is that the state of the engine at the time of the problem is not lost, misread, or forgotten; rather, the state is embedded in the print sample.

Furthermore, more state information is stored in the engine 202 and controller/processor unit 208 than is available to the CE for recording, and this "unavailable" data can also be embedded in the test print, according to a preferred embodiment. The result is a more efficient and faster response to customer print quality issues, leading to reduced cost and improved customer satisfaction.

Characteristics of the printer components that one might not want the customer to monitor, because the cost of meeting customer satisfaction might increase, may also be embedded. For example, a customer printing nothing but statements, with only moderate demands on print quality, might be left running a particular component, like photoconductor (not shown) or fusing or drying system 204, much longer than a customer with more demanding imaging applications. The first customer, being able to monitor the age of the drum, would be more likely to demand a replacement drum before one is really needed for maintaining print quality.

Figure 1:
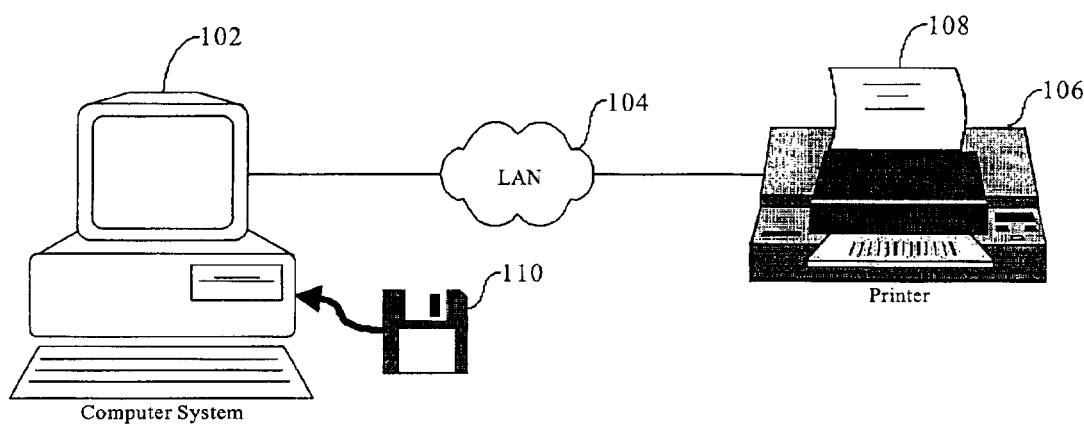
FIG. 1 is a block diagram illustrating an embedded data printing system in accordance with a preferred embodiment of the present invention.

FIG. 1 illustrates an exemplary data embedding printer system according to a preferred embodiment of the present invention. The data embedding printer system 100 includes printer 106 communicatively coupled to a computer system 102 via a local area network interface 104. The local area network interface 104 may be a wired communication link or a wireless communication link. The printer 106 may also be communicatively coupled with the world-wide-web, via a wide area network interface (not shown) via a wired, wireless, or combination of wired and wireless local area network communication links 104. Alternatively, the printer 106 may also be communicatively coupled locally to the computer system 102.

Each computer system 102 may include, inter alia, one or more computers and at least a computer readable medium 110. The computers preferably include means for reading and/or writing to the computer readable medium. The computer readable medium allows a computer system to read data, instructions, messages or message packets, and other computer readable information from the computer readable medium. The computer readable medium, for example, may include non-volatile memory, such as Floppy, ROM, Flash memory, Disk drive memory, CD-ROM, and other permanent storage. It is useful, for example, for transporting information, such as data and computer instructions, between computer systems. Furthermore, the computer readable medium may comprise computer readable information in a transitory state medium such as a network link and/or a network interface, including a wired network or a wireless network, that allow a computer to read such computer readable information.

The printer 106, according to the present example, includes a controller/processor unit 208 (shown in FIG. 2), which processes instructions, performs calculations, and manages the flow of information through the printer 108. Additionally, the controller/processor 208 is communicatively coupled with program memory 218. Included within program memory 218 are a data embedding application 220 (which will be discussed in later in greater detail), supply monitoring module 222, and a self-analysis module 224. The controller/processor unit 208 manages resources, such as the data stored in data memory 226, the scheduling of tasks, the operation of the printer engine 202, and processes the operation of the data embedding application 220 and self-analysis module 224 in the program memory 218. The controller/processor unit 208 may also manage a communication network interface 214 for communicating with the network link 104, a computer-readable medium drive 216, and sensors 210. Additionally, the controller/processor unit 208 also manages many other basic tasks of the printer 106 in a manner well known to those of ordinary skill in the art.

Figure 2:
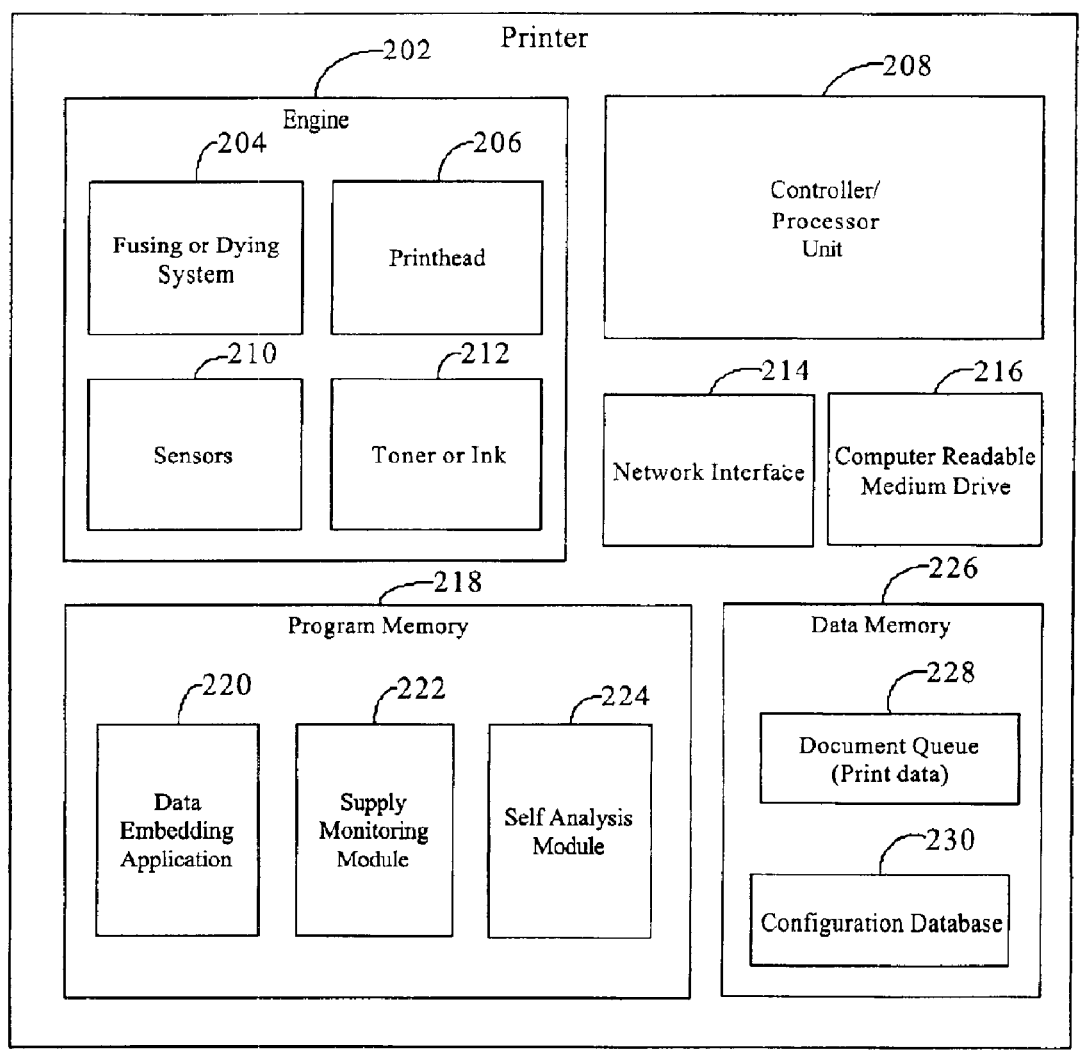
FIG. 2 is a more detailed block diagram showing a printer in the system of FIG. 1, according to a preferred embodiment of the present invention.

In a preferred embodiment, the print engine 202 is communicatively coupled to the controller/processor unit 208. The print engine 202, according to a preferred embodiment, may include a fusing or drying system 204 and a printhead 206. The printhead 206 is typically used to apply toner or ink 212 to paper 108. In accordance with the preferred embodiments of the present invention, the output of electronic images can be applied to many different output mediums. The word "print", as used herein, denotes the output of electronic image from digital representation in a computational system, to a physical medium, such as paper, cloth, electronic display, flexible-medium display (such as "e-paper"), or other output medium as will be evident to someone of ordinary skill in the art in view of the discussion herein. Lastly, as shown in FIG. 2, the data memory 226 is communicatively coupled to the controller/processor unit 208 and may contain a document queue 228 of print jobs, and a configuration database 230.

Figure 3:
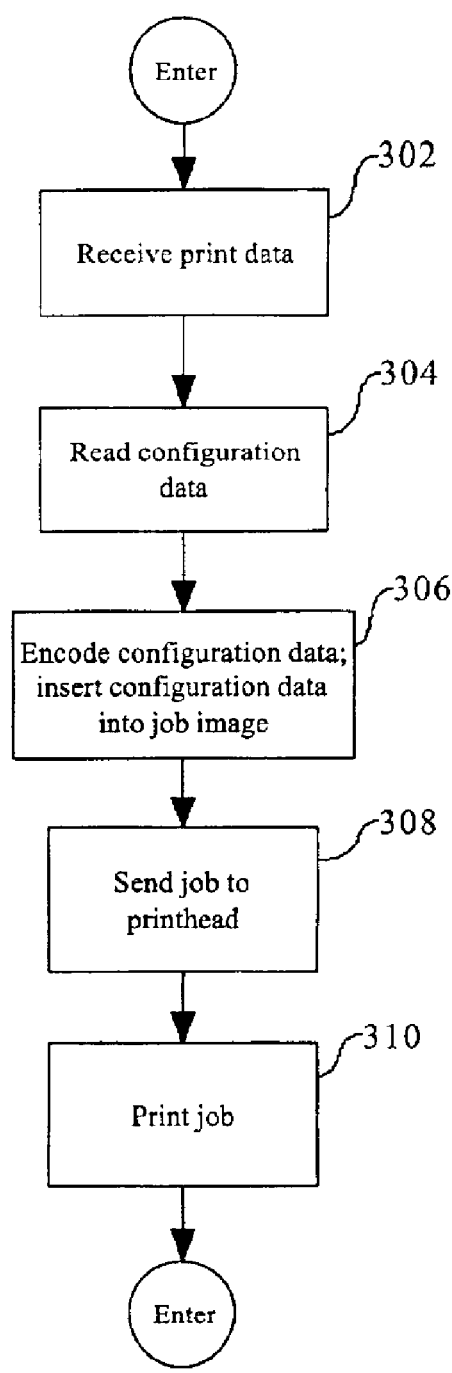
FIGS. 3 and 4 are operational flow diagrams illustrating exemplary operational sequences for the system of FIG. 1, according to a preferred embodiment of the present invention.
Figure 4:
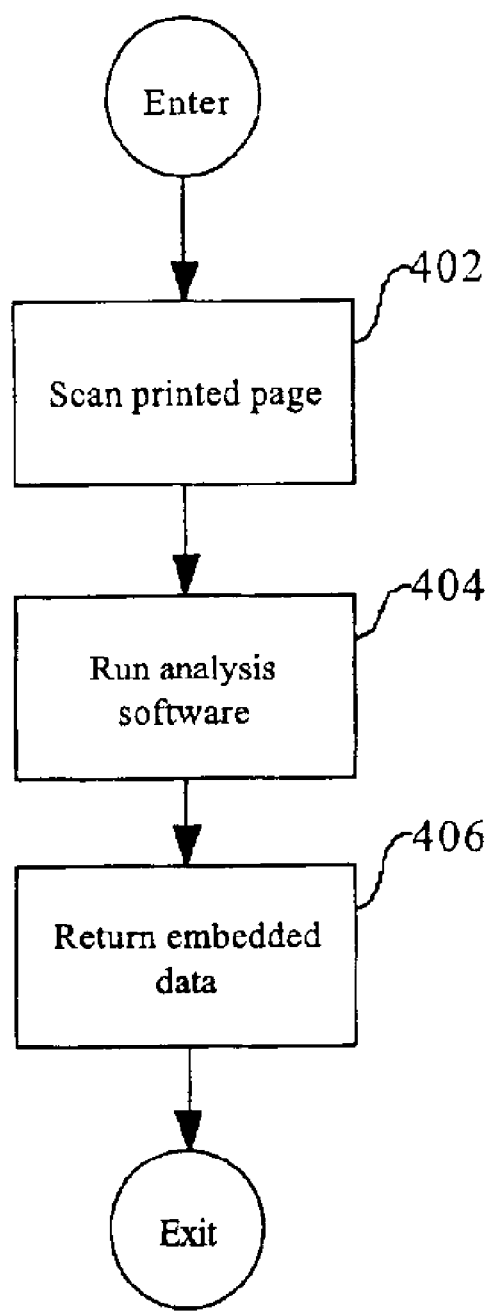

FIGS. 3 and 4 are operational flow diagrams illustrating exemplary operational sequences for the system of FIG. 1. The system enters the sequence at step 302, wherein an event triggers the printer 106 to receive print data. The controller/processor unit 208, at step 304, reads information about the hardware and/or software configuration, which can be from a configuration database 230, contained in the data memory 226. The configuration database 230, may be maintained internally (which can include information such as fusing or drying system 204 life, which would be reset by the CE after replacing a fusing or drying system 204), or from the printer 106 itself for configuration that the printer 106 maintains (which can include DIP switch settings, contrast, etc.) This information could have been read and encoded by the control unit some short time in advance, so that it wasn't necessarily reading and encoding in real time for every page printed.

The controller/processor unit 208 encodes this information, at step 306 and inserts it into the page to be printed by one of several methods. There are two basic methods of embedding data, which may be used independently of each other, or in combination. In the first method, the pels themselves may be modified, through the addition or subtraction of pels near existing pel groupings in the image, for which there is existing technology on the method of embedding so that the perceptual print quality is not affected. In the second, the printer 106 may make selective use of toners or inks 212 with different properties e.g., a toner or ink 212 with detectable magnetic properties may be used in specific areas, so that the appearance of the print is unchanged, but a magnetic scanner will be able to detect the underlying pattern.

Means for embedding data are taught in U.S. Pat. No. 5,825,892, "Protecting Images With an Image Watermark", filed on Oct. 28, 1996; U.S. Pat. No. 5,530,759, "Color Correct Digital Watermarking of Images", filed on Feb. 1, 1995; and U.S. Pat. No. 5,875,249, "Invisible Image Watermark for Image Verification", filed on Jan. 8, 1997; the entire teachings of which are hereby collectively incorporated by reference. Additional well-known sources of information for teaching embedding data include the following references presented at the IEEE International Conference on Image Processing 2000, 10–13 Sep., Vancouver: "A BLIND & READABLE WATERMARKING TECHNIQUE FOR COLOR IMAGES", by M. Caramma, R. Lancini, F. Mapelli, and S. Tubaro; "JOINT HALF TONING AND WATERMARKING", by D. Kacker and J. Allebach; and "FOURIER DESCRIPTORS WATERMARKING OF VECTOR GRAPHICS IMAGES", by V. Solachidis, N. Nikolaidis, and I. Pitas.

Figure 5:
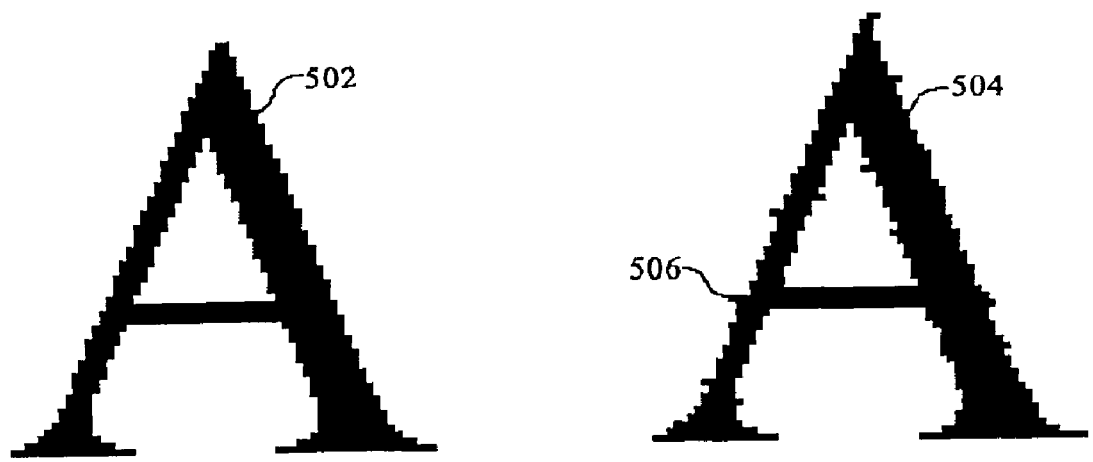
FIG. 5 is an exemplary text character illustrating embedded data.

An example of a printed character image with embedded data is shown in FIG. 5. A text character 502 is modified by changing the characteristics of certain pels 506 to create a new character 504, which contains embedded data. The differences between the characters are unperceivable to the naked eye when printed in a typical sized font. Considerations for data embedding algorithms include the following:

1. The data must be robust to handle printer configuration, including contrast, PQE, and mix age. This can be accomplished through self-calibrating data embedding, which is existing technology.

2. The data must be robust to overcome typical mild-to-moderate print quality errors, including slight beam alignment errors, over toning, mild streaking or spotting, and small, sparse voids.

The controller/processor unit 208 then sends the page to the printhead 206, where, according to a preferred embodiment, the page is created in toner or ink 212 on the paper 108.

A number of events may trigger the process to begin. For example, the printer 106 may be configured to run a self-analysis application at certain time intervals. Alternatively, a customer or technician could be experiencing problems with the printer and manually requests a test page to be printed by pushing a "test page" button. The "test page" button could be a physical button on the printer 106, or a request through diagnostic software. Certain keywords or symbols or phrases hidden within the context of the print data may be used as a trigger. Sensors 210 could also trigger an alarm that would initiate the embedding process by indicating an alarm condition of a variety of sources such as toner being low, or the glass being dirty. Other triggers could be a request for the document to have a time or date stamp, engine serial number (mentioned below), documents originating from a specific computer or workgroup, or the printer 106 could be configured to encode data and then embed data that corresponds to the encoded data in a printed image in every printed page.

If a problem occurs, the CE or operator takes the printed page that is representative of the error, or which prints while the error is occurring, and sends the page to additional support departments. The page is then scanned, at step 402, and run through analysis software, at step 404. The analysis software returns the embedded data from the print, at step 406, including configuration information, etc. This information may be used to diagnose the problem.

An additional application of the technology is validation by allowing printers to become "digital notaries". Documents that are printed for legal or secure applications (e.g., legislature, or other government applications) may have a time stamp on the page, which may not be seen and altered by a hostile party. Printer serial number may be required for secure applications to assist in tracking all printed copies of closely controlled, classified data. The present invention can be extended to embedding in the document the date, time, printer serial number, and other printer settings. This data may be read out when required to assist with an investigation, to verify the print.

The present invention can be realized in hardware, software, or a combination of hardware and software. A system according to a preferred embodiment of the present invention can be realized in a centralized fashion in one computer system, or in a distributed fashion where different elements are spread across several interconnected computer systems. Any kind of computer system—or other apparatus adapted for carrying out the methods described herein—is suited. A typical combination of hardware and software could be a general purpose computer system with a computer program that, when being loaded and executed, controls the computer system such that it carries out the methods described herein.

The present invention can also be embedded in a computer program product, which comprises all the features enabling the implementation of the methods described herein, and which—when loaded in a computer system—is able to carry out these methods. Computer program means or computer program in the present context mean any expression, in any language, code or notation, of a set of instructions intended to cause a system having an information processing capability to perform a particular function either directly or after either or both of the following a) conversion to another language, code or, notation; and b) reproduction in a different material form.

Although specific embodiments of the invention have been disclosed, those having ordinary skill in the art will understand that changes can be made to the specific embodiments without departing from the spirit and scope of the invention. The scope of the invention is not to be restricted, therefore, to the specific embodiments, and it is intended that the appended claims cover any and all such applications, modifications, and embodiments within the scope of the present invention.

What is claimed is:

1. A method comprising the steps of:
   triggering an embedding algorithm in response to a triggering event;
   receiving print data;
   reading printer configuration data;
   encoding the printer configuration data;
   embedding the encoded printer configuration data into the print data;
   sending the print data to a printhead; and
   printing the print data as a visible image comprising the embedded encoded printer configuration data, wherein the perceptual print quality of the print data in the visible image remains substantially unaffected and the embedded encoded printer configuration data is substantially unperceivable to a person's naked eye.

2. The method of claim 1, wherein the triggering step comprises initiating a triggering event via a self-diagnosing algorithm.

3. The method of claim 1, wherein the triggering step comprises initiating a triggering event by activating an alarm by a sensor.

4. The method of claim 1, wherein the triggering step comprises initialing a triggering event by detecting predetermined at least one of keywords and symbols within print data.

5. The method of claim 1, wherein the triggering step comprises initialing a triggering event by detecting the print data originates from a predetermined source.

6. The method of claim 1, wherein the triggering step comprises initiating a triggering event in response to detecting a predetermined time, and wherein the encoded configuration data comprises a time stamp.

7. The method of claim 1, wherein the triggering step comprises initiating a triggering event in response to detecting a predetermined date, and wherein the encoded configuration data comprises a date stamp.

8. The method of claim 1, wherein the triggering step comprises initiating a triggering event by recognizing a set parameter to embed data in the print data.

9. The method of claim 1, wherein the triggering step comprises initiating a triggering event by detecting the activation of a button.

10. The method of claim 9, wherein the activation of the button comprises a detection of activation of a physical button on a printer device.

11. The method of claim 9, wherein the button comprises a "soft" button in a software diagnostic application.

12. The method of claim 1, further comprising the steps of:
    scanning the printed data to provide scanned data;
    analyzing the scanned data to recognize embedded data; and
    providing encoded data corresponding to the recognized embedded data.

13. The method of claim 12, further comprising the step of using the encoded data to diagnose printer problems.

14. An apparatus comprising:
    a data embedding application, for embedding printer configuration data in print data;
    a controller/processor unit communicatively coupled to the data embedding application;
    a data memory communicatively coupled to the controller/processor unit;
    a print engine communicatively coupled to the controller/processor unit;
    a printhead communicatively coupled to the print engine; and
    a triggering event detector, communicatively coupled to the data embedding application and the controller/processor unit, for the printhead printing the print data as a visible image comprising the embedded data in response to the triggering event detector detecting a triggering event at the apparatus, wherein the perceptual print quality of the print data in the visible image remains substantially unaffected and the embedded data is substantially unperceivable to a person's naked eye.

15. The apparatus of claim 14, further comprising a self-analysis module communicatively coupled to the controller/processor unit, the self-analysis module for providing a triggering event.

16. The apparatus of claim 14, further comprising a supply monitoring module communicatively coupled to the controller/processor unit, the supply monitoring module for providing a triggering event.

17. The apparatus of claim 14, wherein the data memory comprises:
a configuration database including configuration data for the triggering event detector and for the data embedding application; and
a document queue.

18. A printing system comprising:
at least one networked device;
a network interface, communicatively coupled to the at least one networked device;
a data embedding application, for embedding printer configuration data in print data;
a controller/processor unit communicatively coupled to the data embedding application and to the network interface;
a data memory communicatively coupled to the controller/processor unit; a print engine communicatively coupled to the controller/processor unit;
a printhead communicatively coupled to the print engine; and
a triggering event detector, communicatively coupled to the data embedding application and the controller/processor unit, for the printhead printing the print data as a visible image comprising the embedded data in response to the triggering event detector detecting a triggering event, wherein the perceptual print quality of the print data in the visible image remains substantially unaffected and the embedded data is substantially unperceivable to a person's naked eye.

19. The system of claim 18, further comprising a document source detection module communicatively coupled to the controller/processor unit, the document source detection module for providing a triggering event.

20. The system of claim 18, further comprising a supply monitoring module communicatively coupled to the controller/processor unit, the supply monitoring module for providing a triggering event.

21. The system of claim 18, wherein the data memory comprises:
a configuration database including configuration data for the triggering event detector and for the data embedding application; and
a document queue for storing documents received from the at least one networked device.

22. A computer readable medium including computer instructions for driving a printer, the computer instructions comprising instructions for:
detecting a triggering event;
receiving print data;
reading printer configuration data;
encoding the printer configuration data;
in response to detecting the triggering event, inserting the printer configuration data into the print data;
sending the print data to a printhead; and
printing the print data as a visible image comprising the inserted encoded printer configuration data, wherein the perceptual print quality of the print data in the visible image remains substantially unaffected and the inserted encoded printer configuration data is substantially unperceivable to a person's naked eye.

23. The computer readable medium of claim 22, wherein the detecting of a triggering event comprises detecting a self-diagnosing event.

24. The computer readable medium of claim 22, wherein the detecting of a triggering event comprises detecting an activation of an alarm by a sensor.

25. The computer readable medium of claim 22, wherein the detecting of a triggering event comprises detecting predetermined at least one of keywords and symbols within print data.

26. The computer readable medium of claim 22, wherein the detecting of a triggering event comprises detecting the print data originates from a predetermined source.

* * * * *